Feb. 28, 1956 D. H. PRITCHARD ET AL 2,736,859

COLOR PHASE ALTERNATION CONTROL SYSTEM

Filed July 25, 1952 2 Sheets-Sheet 1

INVENTORS
DALTON H. PRITCHARD
& ALFRED C. SCHROEDER
BY Otis A. Mitchell
ATTORNEY

COLOR PHASE ALTERNATION CONTROL SYSTEM

Filed July 25, 1952 2 Sheets-Sheet 2

INVENTORS
DALTON H. PRITCHARD
& ALFRED C. SCHROEDER
BY [signature]
ATTORNEY

United States Patent Office 2,736,859

Patented Feb. 28, 1956

2,736,859

COLOR PHASE ALTERNATION CONTROL SYSTEM

Dalton H. Pritchard, Princeton, N. J., and Alfred C. Schroeder, Huntingdon Valley, Pa., assignors to Radio Corporation of America, a corporation of Delaware Application July 25, 1952, Serial No. 300,853

3 Claims. (Cl. 323—111)

Figure 1:
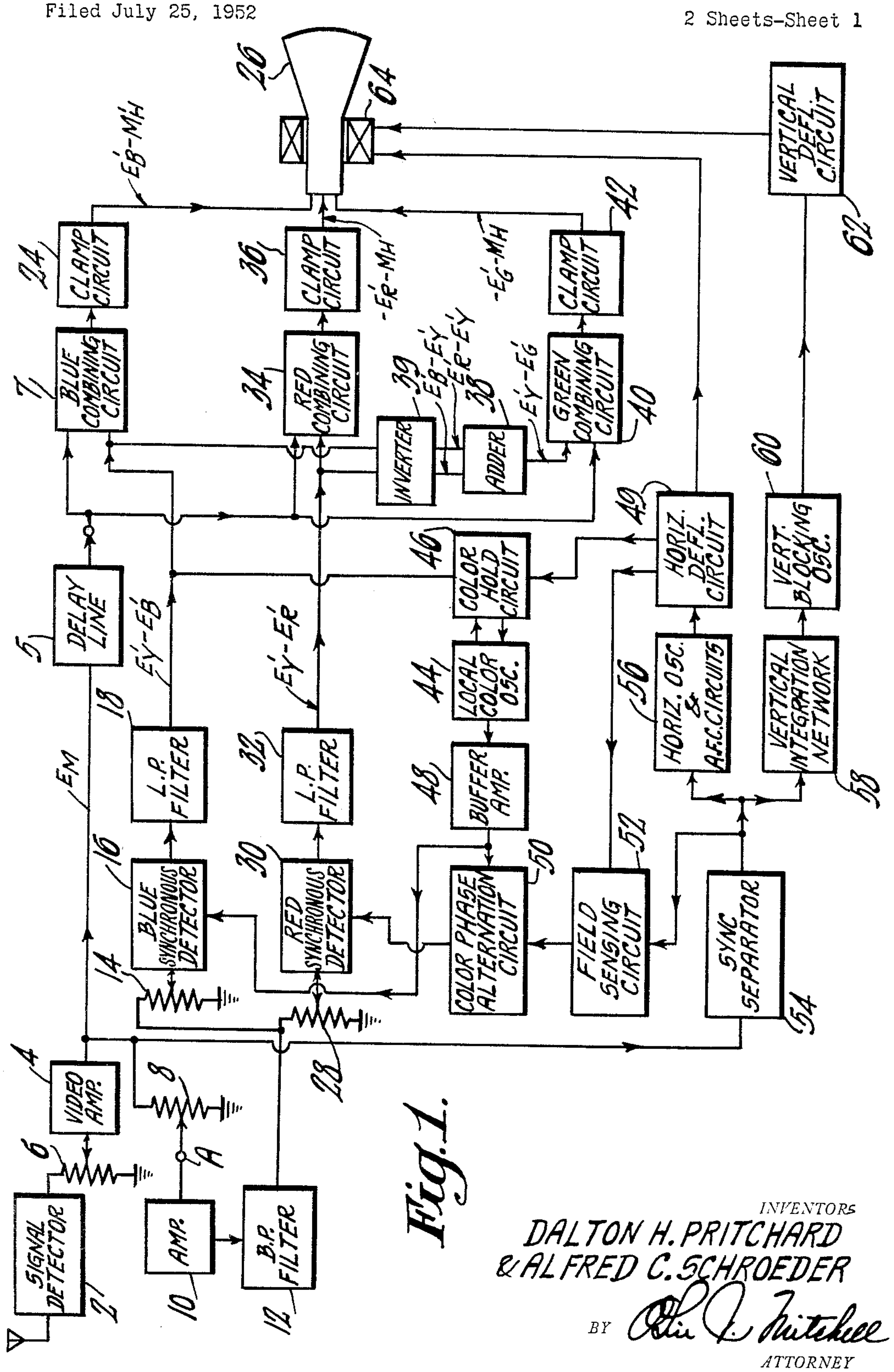

This invention relates to improvements in color television receivers and in particular to improvements in color phase alternation used in certain types of receivers.

In one color television system the signal representing the required video information has two video components. One component represents variations in brightness and corresponds to the signal now employed in standard black and white television systems. The other video component is a color carrier that is phase and amplitude modulated in accordance with the hue and saturation of the color represented.

One way of deriving the color carrier is as follows. The output of a color oscillator of color carrier frequency is applied to a phase splitter and each differently phased output of the phase splitter is amplitude modulated with signals representing different sets of color information. The output of the separate modulations are then combined to provide the desired color carrier. In order to save bandwidth, the frequency of the color carrier is so chosen that it and at least some of its sidebands be within the portion of the frequency spectrum occupied by the brightness signal.

In order to recover and separate the different sets of color information that were used to amplitude modulate the different phases of color carrier frequency provided by the phase splitter in the transmitter, it is necessary to heterodyne or multiply the color carrier with alternating current waves having corresponding phases. The apparatus for recovering the color information in this manner is generally termed a synchronous detector.

In a color television system of the type described different phases of the subcarrier represent different colors. For example 0° may indicate blue, 124.26° could indicate green and 270° could be selected to indicate red. In this example if the phase of the subcarrier gradually shifted from 0° to 360° it would represent blue, green and red in the order named. For reasons discussed in the U. S. application No. 220,622, issued in the name of Sziklai, Schroeder and Bedford on April 12, 1951, various advantages can be derived by changing the colors represented by the different phase of the color subcarrier so that the same shift in the phase of the subcarrier from 0 to 360° would represent the colors blue, red and green in the order named. It will be noted that the order in which the colors are represented is then reversed. Circuits for changing the phases indicating certain color information are hereinafter referred to as color phase alternation circuits and an improved circuit for performing this function is the subject of the present invention.

If the colors represented by the different phases of the color carrier are changed at the transmitter some means must be provided at the receiver for indicating when the change takes place so that the colors can be properly recovered.

Previously color phase alternation has been brought about in the following manner. Each of the synchronous detectors in a receiver were coupled to a different tap point on a delay line having a total delay of 360° of the color carrier frequency. During one field a wave of color carrier frequency was applied to one end of the delay line so that different phases of the wave were available at the different tap points. During the next field the wave of color carrier frequency was applied to the opposite end of the delay line. As is well known, the closer the tap point to the energized end of the delay line, the nearer it is to the phase of the wave applied to that end. Therefore by energizing opposite ends of the line during successive fields the phases of the wave at the different tap points are interchanged. Some difficulties have been experienced in that reflections from the non-energized ends of the line interfere with the apparent phase of the wave at the various tap points. In addition, the delay line attenuates the wave applied to it so that as the wave progresses from one end of the line to the other its amplitude is reduced. Because the line is energized from one end during one field and from the other end during a succeeding field, the amplitude of the wave at any tap other than one located at the exact center of the line changes from field to field. At the center the attenuation of the wave is the same irrespective of the end energized. Such an arrangement is useful where two or three synchronous detectors are employed.

In accordance with one of the objects of this invention, the necessity for using a delay line is completely eliminated and the attendant difficulties are entirely avoided in arrangements requiring only two different phases of the wave of color carrier frequency during any one field.

Briefly, this objective can be attained by energizing the primary of a transformer with one phase of the wave of carrier frequency and coupling this phase to one of the synchronous detectors. The secondary of the transformer is grounded at its center so that the wave at one end is 180° out of phase with the other. Each end of the secondary is coupled to a common load circuit by a diode. A square wave that changes polarity during each vertical blanking interval is applied so as to permit the diodes to conduct alternately, one during one field and the other during the next. Thus the phase of the wave of color carrier frequency appearing across the common load circuit is altered by 180° at field rate. If required phase shifting devices can be included in the separate diode branches so that the phase change from field to field is different than 180°.

In accordance with another feature of this invention, the switching from one phase to another is accomplished in such a manner as to minimize the effect of any transients that may be produced.

Figure 2:
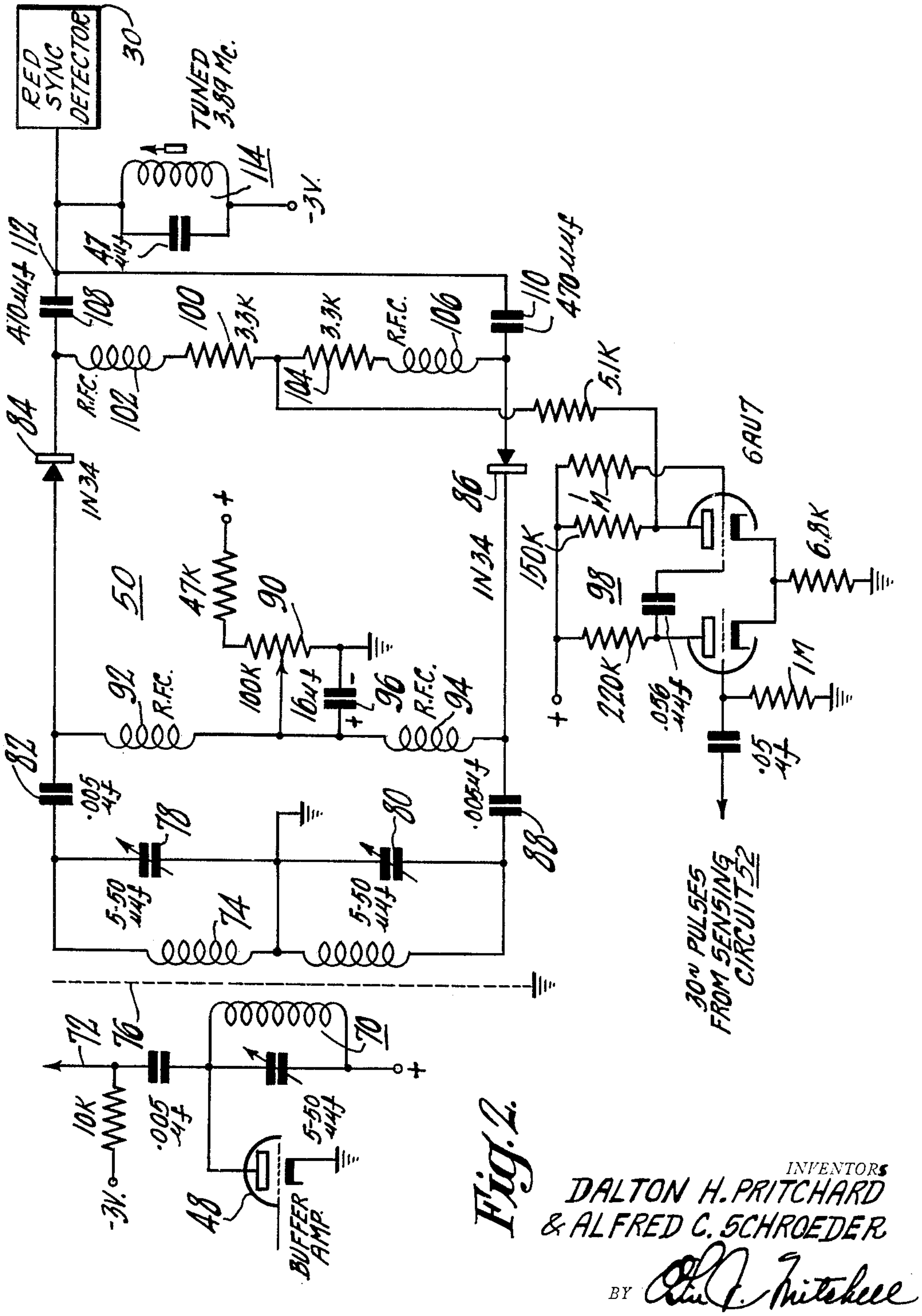

The manner in which this invention operates to attain these objects and advantages may be better understood after a detailed consideration of the drawings in which:

Figure 1 is a block diagram of one form of color receiver in which the present invention can be used; and Figure 2 illustrates a circuit embodying the principles of the invention.

The present invention may be used advantageously in any color television system of the type set forth above, i. e., one in which the color carrier is modulated with sets of color information that contain components of each of the selected component colors. Many variations in the brightness signal and the sets of color information that are applied to the modulators at the transmitter so as to form the color carrier may be employed, but the invention will be described as embodied in a color television system described in an article entitled "Principles of NTSC Compatable Color Television" commencing on page 88 of the February 19, 1952 issue of "Electronics."

The transmitted signal $E_m$ may be defined by the following expression:

$$(a)\quad E_m = E_y' + \frac{1}{1.14}\left(\frac{1}{1.78}(E_b - E_y')\sin\omega t + (E_r' - E_y')\sin(\omega t \pm 90°)\right)$$

where $E_y'$ is the gamma corrected brightness signal that is comprised of gamma corrected color signals as indicated by the expression:

(*b*) $E_y'=0.59E_g'+0.30E_r'+0.11E_b'$ $E_g'$, $E_r'$ and $E_b'$ represent the green, red and blue gamma corrected color signals respectively and $\omega$ is the frequency of the color carrier expressed in radians. The color carrier may be derived during one field by modulating a zero degree phase of the color carrier frequency with a blue color difference signal $E_b'-E_y'$ reduced by a factor of 2.03 and a 90° phase of a red color difference signal $E_r'-E_y'$ that is reduced by a factor of 1.14. During the next field the color carrier may be derived by modulating a zero degree phase of the color carrier frequency with the same portion of the blue color difference signal $E_b'-E_y'$ as before but by modulating a 270° phase of the color carrier frequency with the same portion of the red color difference signal $E_r'-E_y'$. The upper frequency of the color difference signals may be limited to some low value such as 1 megacycle so that the sidebands produced by the modulator in response to the color difference signals lie within 1 megacycle on each side of the color carrier frequency $\omega$. As $\omega$ is generally placed rather high in the video spectrum of the brightness signal, the color information represented by the sidebands lies in the upper portion of the video spectrum. During each field the outputs of the modulators are combined to form the color carrier and it is added to the brightness signal $E_y'$. The brightness signal $E_y'$ is itself derived by adding the different color signals in the proportions indicated by the expression (*b*). The portion of the color difference signals applied to the modulators is as indicated by the coefficients of the expression (*a*).

One form of receiver that may be used to reproduce images in color from the signal $E_m$ and which embodies the present invention is illustrated in the block diagram of Figure 1. The signal $E_m$ is recovered by any suitable signal detector 2, and a desired portion of it is supplied to a video amplifier 4, via a contrast control 6 that is shown as a potentiometer. The output of the video amplifier is applied via a delay line 5 to a blue combining circuit 7. A desired portion of the output of the video amplifier is selected by a chroma control 8, here shown as a potentiometer, and is coupled via an amplifier 10 to a band pass filter 12 that is designed to pass frequencies in the upper region of the video spectrum occupied by the sidebands containing the color information. A portion of the output of the band pass filter 12 is coupled by a potentiometer 14 to a blue synchronous detector 16 wherein it is heterodyned with a zero degree phase of the color carrier frequency. It is to be understood that this zero degree phase is the same phase as the color carrier has at the synchronous detector when it is zero degrees at the transmitter. The manner in which this phase of the color carrier frequency is derived will be described below. If the transmitted and received signal $E_m$ is as represented by the expression (*a*) and if the overall relative gain of the chroma control 8, the amplifier 10, the band pass filter 12, the potentiometer 14, the synchronous detector 16 and the low pass filter 18 with respect to the gain afforded by the signal $E_m$ by the delay line 5 is 2.03, the negative blue color difference signal $E_y'-E_b'$ is recovered. The heterodyning action of the synchronous detector produces upper and lower sidebands, and the lower sidebands containing the color difference signals in their original frequency is selected by a low pass filter 18. If the lowest frequency passed by the band pass filter 12 is not lower than the highest frequency passed by the low pass filter 18, no frequencies of the signal $E_m$ will pass directly through both of them. The negative blue color difference signal $E_y'-E_b'$ that appears at the output of the low pass filter 18 is then applied to the blue combining circuit 7. The signal $E_m$ appearing at the output of the video amplifier 4 is delayed by a delay line 22 by the same amount that the negative blue color difference signal $E_y'-E_b'$ is delayed in passing from the output of the video amplifier 4 to the input of the combining circuit 7. Thus the signal $E_m$ and the negative color difference signal $E_y'-E_b'$ arrive at the input of the combining circuit 7 in proper time relationship. The gain of the blue synchronous detector 16 is generally made greater than the maximum required so that the chroma control 8 can be adjusted to increase or decrease the relative amplitude of the color difference signal with respect to the signal $E_m$. In this way the amplitude of the brightness component $E_y'$ in the signal $E_m$ can be made equal to the amplitude of the corresponding brightness component $E_y'$ in the negative blue color difference signal. With the polarities indicated the subtraction of the signal $E_m$ from the negative color difference signal $E_y'-E_b'$ yields:

(*c*) $E_y'-E_b'-E_y'-$ (A. C. components of expression "*a*").

The low frequency brightness components $E_y'$ and $-E_y'$ cancel out. The high frequency components of $E_y'$ pass through the combiner 7. The signals at the output of the combiner 7, including the high frequency portion $-M_H$ of the brightness signal $-E_y'$ and the low frequency color signal $-E_b'$ are clamped in normal manner by a D. C. restoration or clamp circuit 24 before being applied to an electrode of a color kinescope 26 that control the intensity of the blue light emitted by the kinescope.

In order to recover the red signal $-E_r'$ the following operation is performed. The output of the band pass filter 12 is coupled via a potentiometer 28 to a red synchronous detector 30 wherein it is heterodyned during successive fields with 90° and 270° phases of the color carrier frequency that are derived in a manner to be described. Two sidebands are produced by the modulation process, and the lower one containing the original frequencies of the negative red color difference signal $E_y'-E_r'$ that was applied to one of the modulators at the transmitter is selected by a low pass filter 32 and is applied to a red combining circuit 34 where it is combined with the total received signal $E_m$ (see expression "*a*") in such manner as to cancel out the low frequency portion of the brightness signal $E_y'$ and produce the low frequency red color signal $E_r'$. This signal, the high frequency portion of $E_y'$ and the color carrier and its sidebands are all clamped in a normal manner by a clamp circuit 36 before being applied to an electrode in the kinescope 26 that controls the intensity of the red light emitted.

Positive color difference signals $E_b'-E_y'$ and $E_r'-E_y'$ are reversed in separate sections of an inverter 39 and 51% of the former and 19% of the latter are combined in an adder 38 so as to derive a negative green color difference signal $E_y'-E_g'$. Inasmuch as only fractional amounts of the color difference signals are required, the adder 38 does not have to furnish any gain and therefore peaking circuits that introduce delay are not required. The negative green color signal $E_g'-E_g'$ is then applied to a green combining circuit 40 where it is combined with the signal $E_m$ so as to produce the green color signal $-E_g'$. This signal is clamped by a circuit 42 and applied to an electrode of the kinescope 26 that controls the amount of green light emitted.

In the receiver just described the negative color signals $-E_b'$, $-E_r'$ and $-E_g'$ emerged from the various combining circuits. If positive color signals are required the amplifier 10 of Figure 1 could be a cathode follower so that the polarity of the color signals would not be reversed and the outputs of the synchronous detector would be the original color difference signals $E_b'-E_y'$ and $E_r'-E_y'$. In order to cancel the $-E_y'$ term in the combining circuits any known means for inverting the signal $E_m$ could be employed.

It is apparent that some means must be provided for supplying the 0° phase of the color carrier frequency to the blue synchronous detector 16 during every field and the 90° and 270° phases to the red synchronous detector 30 during successive fields in fixed phase relationship with the corresponding phases supplied to the modulators at the transmitter. One way of conveying the synchronizing information is to transmit a burst of 90° phase of the color carrier frequency immediately following each horizontal sync pulse as described in a U. S. patent application to A. V. Bedford that was filed on February 11, 1950, and bears the Serial No. 143,800 and a similar method is also described in the magazine Electronics for March 1952, on page 96. The burst may be used in a variety of ways to control the phase and frequency of the local oscillator 44. In our U. S. patent application bearing Serial No. 300,854, filed on July 25, 1952, for example, advantage is taken of the fact that during the burst interval the output of the blue synchronous detector 14 is zero if the carrier frequency wave applied to the blue synchronous detector is 0°. If the local color oscillator varies in phase in one direction, the output of the blue synchronous detector becomes proportionately positive and if the oscillator shifts in phase in the opposite direction, the input of the blue synchronous detector becomes proportionately negative. These voltages are applied so as to control the frequency and phase of the oscillator. The output of the local oscillator is applied to the blue synchronous detector 16 via a buffer amplifier 48. In order to obtain the phase alternation between 90° and 270° the output of the buffer amplifier 48 is coupled to the red synchronous detector 30 via a color phase alternation circuit 50 to be described.

A color field sensing circuit 52 provides in response to the flyback pulses occurring in the horizontal deflection circuit 48 and the output of a standard sync separator circuit 54 30 cycle pulses that serve to change the phase appearing at the output of the color phase alternation circuit at field rate. A representative color phase sensing circuit is described in the copending U. S. patent application of D. H. Pritchard, Ser. No. 300,852, filed July 25, 1952.

The scanning of the beams in the kinescope 26 is controlled in any known manner by a horizontal oscillator and AFC circuit 56, the horizontal deflection circuit 48, a vertical integrating network 58, a vertical blocking oscillator 60, a vertical deflection circuit 62 and a yoke 64.

Figure 2 illustrates one form that the color phase alternation circuit 50 of Figure 1 may assume in accordance with the principles of this invention. The buffer amplifier 48 of Figure 1 may be coupled to the color phase alternation circuit in the following manner. A parallel resonant circuit 70 is connected between a source of B+ potential and the plate of a buffer amplifier 48. The plate is coupled to the blue synchronous detector 16 by a condenser and resistor and a lead 72. The coil of the tuned circuit 70 is a primary of a transformer having a secondary winding 74 that is grounded at its center as indicated. A Faraday shield 76 is inserted between the primary and secondary windings of the transformer so as to prevent any capacitive coupling of the sampling frequency from the primary to the secondary. Each half of the secondary 74 may be tuned by variable condensers 78 and 80. The upper end of the secondary is coupled via the condenser 82 to the plate of a diode 84 and the lower end of the secondary is coupled to the cathode of the diode 86 via a condenser 88. The plate of the diode 84 and the cathode of the diode 86 are placed at a selected positive potential by a potentiometer 90 connected as shown. Choke coils 92 and 94 present a high impedance to the sampling frequency and a bypass condenser 96 serves to shunt any of the sampling frequency energy that passes the choke coils to ground.

The 30 cycles pulses supplied by the color phase sensing circuit 52 are applied so as to trigger a cathode coupled multivibrator 98. The output of the multivibrator 98 is therefore a square wave that changes in polarity during each vertical blanking interval. This square wave is coupled to the plate of the cathode of the diode 84 by an isolation resistor 100 and a choke coil 102. It is also coupled to the plate of the diode 86 via resistor 104 and a choke coil 106. The choke coils prevent any of the subcarrier energy from feeding back to the multivibrator 98 and thus possibly affecting its operation. It will be noted that the right hand half of the multivibrator 98 is D. C. coupled to the cathode and plate of the diodes 84 and 86 respectively. Whenever the square wave supplied by the multivibrator 98 is positive the resistance of the diode 84 is decreased because its cathode is driven in a positive direction. However, the resistance of the diode 86 is increased.

The cathode of the diode 84 and the plate of the diode 86 are coupled by condensers 108 and 110 to a terminal 112. A tuned circuit 114 is coupled between a source of negative biasing voltage and the terminal 112. The terminal 112 is coupled to an electrode in the red synchronous detector 30. The circuit 114 is tuned to the color carrier frequency so that it presents a high impedance to the color carrier frequency and a low impedance to the 30 cycle switching frequency of the multivibrator 98. The terminal 112 is D. C. coupled to a grid of the red synchronous detector 30 of Figure 1 and the resonant circuit 114 offers a low D. C. impedance. Fine adjustments of the phase of the carrier wave supplied to the grid of the synchronous detector can be effected by changing the tuning of the circuit 114 to a slight degree.

The overall operation of the circuit shown in Figure 2 will now be described. As is well known to those skilled in the art, the ends of a center tapped secondary winding such as 74 are generally 180° out of phase. Thus during one field when the wave supplied by the multivibrator 98 is positive the resistance of the diode 86 is increased and therefore a relatively large portion of the voltage appearing at the lower end of the secondary 74 is coupled to the terminal 112 and hence to the control grid of the red synchronous detector. However, during the next field, the voltage supplied by the multivibrator 98 becomes negative and the resistance of the diode 84 is increased so that the sampling frequency energy appearing at the upper end of the secondary 74 is coupled to the terminal 112 and hence the grid of the red synchronous detector. Thus from field to field the voltage of sampling frequency that is supplied to the grid of the red synchronous detector changes by 180°.

There are various ways in which the circuit just described may be adjusted so as to cause the sampling frequency voltage wave appearing at the terminal 112 to be 90° out of phase with the sampling frequency voltage wave applied to the sampler at the lead 72. Perhaps the simplest way is to insert a delay line 118 between the terminal 112 and the grid of the red sampler 2, the delay provided by this line being sufficient to delay the signals by 90° of the sampling frequency. Another way of achieving this 90° phase shift is to adjust the tuning of the various resonant circuits. As is well known to those skilled in the art the resonant circuit 70 and the resonant circuits formed by the secondary of the transformer could be detuned so that the voltages appearing across the secondary could be 45° out of phase with the voltage appearing across the primary. An additional phase shift of 45° can be brought about by detuning the parallel resonant circuit 114.

The potentiometer 90 is preferably adjusted so that the D. C. potentials applied to the diode 84 to the cathode of the diode 86 are the same as the D. C. potentials at the plate of the right hand tube of the multivibrator 98. This of course is the same as the average D. C. potential at the junction of the resistors 100 and 104. If this is done, the action of the square wave supplied by the multivibrator 98 has similar effects on the resistance of the diodes 84 and 86. If the potentiometer 90 is not so adjusted, then the lowest resistance of one diode will be either greater or less than the lowest resistance of the other diode and the amount of sampling frequency energy coupled to the tuned circuit 114 will be greater or less, as the case may be, during one field than it is during the rest. If neither one of the diodes is cut off by the square wave supplied by the multivibrator, this means that the voltage supplied through one diode will cancel to a limited degree the voltage supplied to another diode at the sampling frequency. This therefore reduces the maximum amplitude of the sampling frequency wave across the tuned circuit 114 and hence decreases the amplitude of the sampling frequency wave supplied to the red sampler. Therefore in order that the amplitude of the sampling frequency waves be the same for any field and also that the maximum amplitude be obtained, the potentiometer 90 is adjusted as previously stated so that the potential supplied by it to the plate of the diode 84 and the cathode of the diode 86 is the same as the average D. C. potential appearing at the junction of the resistors 100 and 102.

In the arrangement shown, the switching voltage wave supplied by the multivibrator 98 is connected to the right hand side of the diodes, that is to the cathode of the diode 84 and the plate of the diode 86. The biasing voltage supplied by the potentiometer 90 is applied at the other sides of the diodes 84 and 86. As will be apparent to those skilled in the art, the point of application of the switching wave supplied by the multivibrator 98 and the biasing voltage supplied by the potentiometer 90 could be interchanged. It is only necessary that the diodes be biased and that the switching voltages be supplied so as to increase the resistance of one diode while the other diode is decreasing in resistance.

Instead of applying the D. C. potential of the potentiometer 90 as indicated in Figure 2 it would be possible to apply it directly to the center tap on the secondary 74 and to eliminate the coupling condensers 82 and 88. However in such an arrangement it would be necessary to apply extremely large biasing condensers between the center tap and ground in order that the center tap be as near as A. C. ground as possible.

Having thus described the invention what is claimed is:

1. Apparatus for altering at a cyclic rate the phase of a wave appearing at one output terminal with respect to the phase of a wave appearing at another output terminal comprising in combination a source of waves having a predetermined frequency, a first output terminal coupled to said source, a transformer having a primary and a secondary, said primary being coupled to said source, said secondary being center tapped so that the waves induced therein are out of phase at the opposite ends of the secondary, a second output terminal, a load circuit coupled between said terminal and a source of fixed potential, a first diode having its cathode coupled to one end of said secondary winding and its plate coupled to said second output terminal, a second diode having its plate coupled to the other end of said secondary winding and its cathode coupled to said second output terminal, means for applying a fixed potential to the cathode of the first diode and the plate of the second diode, a source of keying waves that change polarity at the cyclic rate, and means for coupling these keying waves to the plate of the first diode and the cathode of the second diode.

2. Apparatus for altering at a cyclic rate the phase of a wave appearing at a first output terminal with respect to the phase of a wave appearing at a second output terminal comprising in combination, a source of waves of a predetermined frequency, means for coupling said waves to said first terminal, a transformer having a primary and a secondary, said primary being coupled so as to be energized by waves provided by said source, a condenser connected in parallel with said primary, means for establishing the mid point of said secondary at ground potential for the waves of this predetermined frequency, a condenser connected between one end of said secondary and ground, a condenser connected between the other end of said secondary and ground, a diode, the cathode of the diode being coupled to one end of the secondary, the plate of said diode being coupled to said second terminal, another diode, the plate of the latter diode being coupled to the other end of said secondary, the cathode of the latter diode being coupled to said second terminal, means for applying a fixed potential to the cathode of one diode and to the plate of the other, means for applying a square wave to the plate of the one diode and the cathode of the other, and a tuned load circuit coupled between said second terminal and ground.

3. Apparatus as described in claim 2 wherein phase shifting means is coupled in series with at least one of said diodes so that the voltages applied to said second terminal are other than 180° apart.

References Cited in the file of this patent

UNITED STATES PATENTS

| | | |
|---|---|---|
| 2,332,681 | Wendt | Oct. 26, 1943 |
| 2,386,087 | Bingley et al. | Oct. 2, 1945 |
| 2,498,391 | Bingley et al. | Feb. 21, 1950 |
| 2,568,250 | O'Brien | Sept. 18, 1951 |
| 2,632,046 | Goldberg | Mar. 17, 1953 |